Dec. 14, 1926.
C. NORDSTROM
1,610,811
VALVE
Filed June 12, 1925
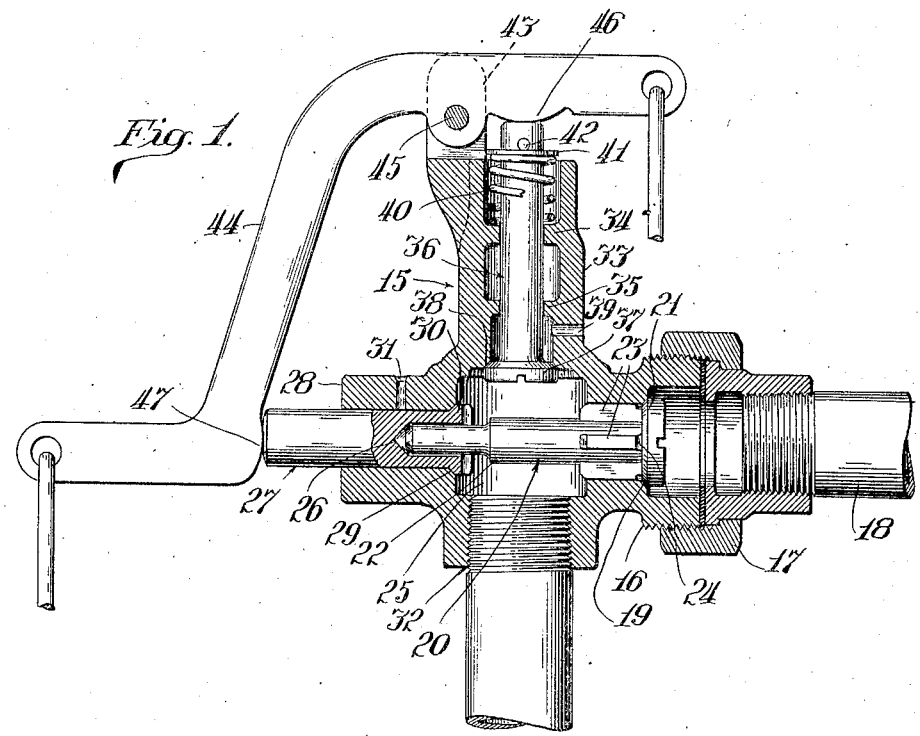
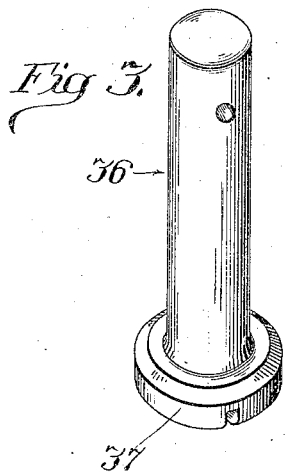
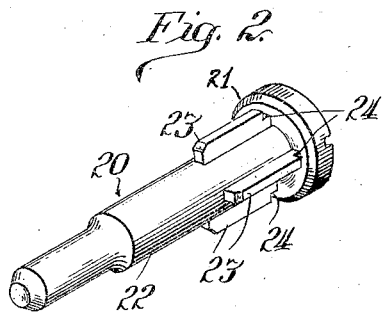
Inventor
Charles Nordstrom,
By George Heidman
Attorney Patented Dec. 14, 1926.

UNITED STATES PATENT OFFICE.

CHARLES NORDSTROM, OF MILWAUKEE, WISCONSIN.

VALVE.

Application filed June 12, 1925. Serial No. 36,566.

My invention relates to a valve more especially intended for use as an air hoist valve; that is to say a three-way valve intended to be employed in connection with hoisting machinery and the like which is pneumatically operated and wherein the valve controls the compressed air supply.

One object of my invention is to provide a construction which is simple and yet positive in its operations; wherein seating of the controlling members or valves will be in the direction of the inflowing pressure; with the construction so arranged, however, that an admitting or exhausting condition of the valve may be easily and quickly obtained.

A further object of my invention is to provide a construction which is comparatively cheap to manufacture and wherein the various elements are easily accessible for assembly and replacement when necessary; while at the same time producing a valve of great durability and which will not require frequent repair as, however, is the case with valves at present in use in connection with hoisting devices for which my improved valve is especially adapted.

The various enumerated objects and advantages, as well as other advantages inherent in the construction, will all be more fully comprehended from the following detailed description of the accompanying drawing, wherein:—

Figure 1 is a sectional elevation of my improved valve.

Figure 2 is a perspective view of the main or inlet valve.

Figure 3 is a perspective view of the exhaust valve.

In the particular exemplification of the invention as disclosed in the drawing, it comprises a suitable body portion or casing 15, cored so as to provide the right angular passages through the body portion; one side of the body portion being provided with the threaded nipple 16 adapted to receive a suitable union as at 17, whereby the air inlet line 18 is secured to the valve. The nipple side or end 16 is bored so as to provide a suitable shoulder or valve-seat at 19 and thus provide a seat for the inlet valve member 20, the head end whereof is preferably beveled as at 21 to conform with the valve-seat 19 and provide complete closure against the inflow of air or other operating medium. The valve 20 comprises an elongated shank or spindle 22; the portion adjacent to the head being preferably provided with a number of radially disposed fins or webs 23 arranged in equi-distant spaced relation to contact with the wall of the casing and thereby suitably guide the valve in its movement. The valve 20, intermediate of the head portion and the webs 23, is preferably provided with a slight annular groove 24 which provides clearance, when the valve is slightly moved off its seat, for the ingress of air or other operating medium which passes from the groove 24 intermediate of the radial fins or webs 23 and into the main chamber 25 of the valve casing.

The elongated spindle 22 is of length sufficient to extend entirely transversely of the main chamber 25, with its end preferably slightly reduced and inserted into a suitable socket 26 of a sleeve member 27 which is slidably mounted in the hub portion 28 of the casing. The hub portion 28 is provided with an opening in axial alignment with the inlet opening in the opposite wall of the casing and is provided with a suitable beveled shoulder as at 29 to provide a suitable seat for the enlarged end or head 30 of the sleeve member 27, which is likewise beveled or tapered adjacent to the head end so as to conform with and provide a firm seat on the shoulder 29. The socket or counterbore 26 in the sleeve 27 is preferably of length slightly greater than the extent to which the end of the spindle 22 of inlet valve 20 enters the socket when the inlet valve 20 and sleeve 27 are in normal closed position. I prefer to so construct these elements so that the inlet valve may firmly seat itself independently of sleeve member 27, and vice versa, when the sleeve has been released by the operating mechanism. The hub 28 is also shown preferably provided with a small oil-hole at 31 whereby the reciprocating sleeve 27 may be kept sufficiently lubricated.

The casing at right angles to the inlet end or hub 16 is shown provided with a tapped opening 32 to receive a suitable connection whereby the operating medium or air is conveyed to the hoist or other machinery to be operated thereby; that is to say, opening 32 constitutes the outlet for the air; and the casing at the opposite side, namely in direct alignment with outlet 32 is shown provided with an elongated portion or hub 33 which is suitably cored so as to provide the webs 34 and 35 which are apertured for the passage of the shank of a release valve 36 which is provided with a suitable head as at 37, having a slight taper or bevel to correspond with and to seat on the tapered or beveled shoulder 38 formed in the casing 15. The hub 33, beyond the valve-seat 38, is provided with an outlet or exhaust port at 39, so that when valve 36 has been moved downwardly off its seat 38, the air, or other medium, within the valve and operating line which connects with opening 32 may exhaust through the port 39.

The upper end of the hub 33 is counterbored to provide a suitable socket or pocket to receive a coil spring 40, one end whereof rests on the web 34 while the other end engages a washer 41 secured on the spindle of valve 36 by means of a suitable pin as at 42; the spring 40 being of sufficient tension and strength to normally hold exhaust valve 36 upwardly against its seat; the seating of the valve being also assisted and maintained through the pressure of the operating medium or air, so that spring 40 need not be of excessive strength.

The hub 33 is also shown provided with a pair of upwardly disposed lobes or extensions 43 which are apertured; the lobes being arranged parallel with each other to receive an operating lever 44 therebetween; the lever being fulcrumed at 45. The lever 44 is of the offset angular formation shown so as to have one portion disposed horizontally across the top of release valve 36, while the depending portion extends down to and into alignment with the inlet valve control sleeve member 27; the lever 44 being shown provided with suitable contacting or operating surfaces, as for example the arcuate surface 46 for the exhaust valve 36 and the shoulder portion 47 for the inlet valve sleeve member 27.

I have shown and described what I believe to be the simplest exemplification of my invention, but modifications may be made without, however, departing from the spirit of my invention.

What I claim is:—

1. A valve comprising a casing having radially disposed nipples or extensions, one of the extensions constituting the inlet, while two of the extensions at right angles to the inlet extension constitute outlets, a slidable valve for said inlet provided with a spindle disposed transversely of the casing, a socketed member slidable in the extension diametrically opposite to the inlet and adapted to receive the end of the inlet valve spindle, said socketed member extending through to the casing exterior and provided with a head at its inner end to close the opening through the last mentioned extension, an exhaust port in one of said outlet extensions, a spring controlled valve slidably mounted in said outlet extension and provided with a spindle extending to the casing exterior, the inlet valve holding extension, socketed member holding extension and said last mentioned outlet extension all being provided with valve-seats, and an angular lever pivotally mounted intermediate of its ends on said casing, with one end adapted to actuate said spring controlled outlet valve when the lever is moved in one direction, while the other end of the lever is adapted to actuate said socketed member to move the inlet valve off its seat when the lever is tilted in the opposite direction.

2. A valve comprising a casing having a pair of intersecting passages arranged at right angles to each other, the inner walls of three of said passages being formed to provide valve-seats while the fourth is adapted to receive a discharge pipe, a pair of telescopic valve members seatable on the diametrically opposite valve-seats for controlling inflow and seatable with the pressure thereof, a valve member seatable with the outflow pressure on the valve-seat disposed at right angles to the axes of the telescopic valve members, the stem of one of the telescopic valve members and the stem of the last mentioned valve member extending to the casing exterior, and an angular lever pivotally mounted on the casing and provided with actuating surfaces at opposite sides of its mounting adapted to contact with the ends of the two last mentioned members.

3. In a valve of the character described, a casing having four openings arranged in diametrically opposite pairs, a slidable inlet valve seatable in the direction of inflow, provided with an elongated stem having radially disposed wings adjacent to the valve-head, the ends of the wings adjacent to the head having a transverse groove to provide clearance intermediate of the head and said wings, and a slidably mounted aligned socketed valve member adapted to receive the stem of the first mentioned inlet valve and arranged to permit complete seating of the inlet valve before seating of the second mentioned valve, the casing being provided with a lubricating opening communicating with the slideway for said socketed valve member.

CHARLES NORDSTROM.